United States Patent

Nobusawa

[15] 3,643,563

[45] Feb. 22, 1972

[54] SHUTTER-TIMING NETWORK

[72] Inventor: Tsukumo Nobusawa, Asaka-shi, Saitama-ken, Japan

[73] Assignee: Asahi Kogaku Kogyo Kabushiki Kaisha, Tokyo-to, Japan

[22] Filed: June 23, 1969

[21] Appl. No.: 835,524

[30] Foreign Application Priority Data

July 3, 1968 Japan....................................43/45878

[52] U.S. Cl. ..............................95/10 CT, 95/42, 95/53 EB, 250/215

[51] Int. Cl. ..........................................................G03b 7/08

[58] Field of Search.............................95/10 C, 42, 53, 53 E; 250/206, 215

[56] References Cited

UNITED STATES PATENTS

| | | | |
|---|---|---|---|
| 3,245,332 | 4/1966 | Kagan | 95/53 |
| 3,324,779 | 6/1967 | Nobusawa et al. | 95/10 C X |
| 3,397,629 | 8/1968 | Mori et al | 95/10 C |
| 3,442,190 | 5/1969 | Erickson | 95/10 C |
| 3,498,194 | 3/1970 | Bellows | 95/10 C |
| 3,533,348 | 10/1970 | Akio Yanagi | 95/10 C X |

*Primary Examiner*—Joseph F. Peters, Jr.
*Attorney*—Stanley Wolder

[57] ABSTRACT

A shutter-timing network comprises a photoconductor and first resistor connected in a series, a timing circuit including a variable second resistor and timing capacitor connected in series, a memory capacitor, and a switch alternatively connecting the memory capacitor across the first resistor and across the timing circuit. The timing capacitor is connected to the input of a solid-state switch whose output controls a shutter closure release electromagnet. The first resistor may be variable and the switch response voltage may be adjusted by a variable resistor bias control. The various adjustments are made in accordance with photographing parameters other than the incident light.

5 Claims, 3 Drawing Figures

INVENTOR
TSUKUMO NOBUSAWA
BY Stanley Wolder
ATTORNEY

SHUTTER-TIMING NETWORK

BACKGROUND OF THE INVENTION

The present invention relates generally to improvements in the automatic timing of camera shutters and it relates particularly to an improved light controlled shutter-timing network employing a through-the-lens light-measuring system.

In the automatic control of the camera shutter in response to the light conditions, where the light-measuring system is of the internal light receiving or through the lens type, in which the light incident on the light-measuring photocell traverses the camera objective and is intercepted or blocked upon activation of the shutter, it is necessary to temporarily memorize an electrical parameter which is a function of the light incident on the photocell immediately prior to the exposure sequence. An expedient which is generally employed is to charge a memory capacitor to a voltage which is a function of the incident light and the other photographing conditions such as the film speed and the set diaphragm opening, and to employ such charged capacitor to control the shutter exposure time.

However, the systems and mechanisms of the above nature heretofore employed and proposed for automatic shutter control possess numerous drawbacks and disadvantages. A complicated circuit and switching arrangement in operative association with the camera cocking and exposure operation sequence is required. As a consequence, low accuracy and reliability results which is due to the adverse influence of ambient temperature on the numerous circuit elements employed and on the associated operating parameters.

SUMMARY OF THE INVENTION

It is a principal object of the present invention to provide an improved light controlled automatically timed camera shutter.

Another object of the present invention is to provide an improved automatically timed camera shutter controlled by a through the lens light measuring system and adjustments corresponding to other photographing parameters than incident light.

Still another object of the present invention is to provide an improved automatically timed camera shutter which responds to temporarily stored information which is a function of the light conditions immediately preceding the opening of the shutter.

A further object of the present invention is to provide an automatically timed camera shutter of the above nature characterized by its reliability, accuracy, simplicity and versatility.

The above and other objects of the present invention will become apparent from a reading of the following description taken in conjunction with the accompanying drawings which illustrate preferred embodiments thereof.

In a sense the present invention contemplates the provision of a light-controlled shutter timing network comprising a photosensitive element, a memory capacitor, means responsive to said photosensitive element for charging said memory capacitor in accordance with the light incident on said photosensitive element, an electrically responsive shutter control device, and network means adjustably responsive to the charge on said memory capacitor for actuating said shutter control device at a time which is an adjustable function of said charge. In the preferred form of the improved network, a photoconductor and first resistor are connected in series across a battery. A memory capacitor is alternatively connected through a double-throw switch across the first resistor or across a timing network including a series connected timing capacitor and variable second resistor. The timing capacitor is connected to the base of a switching transistor whose emitter is connected to the battery through a variable voltage divider which adjusts the switching signal level of the transistor. The transistor output controls a shutter closure release electromagnet through an amplifier network. In an alternative arrangement the first resistor is variable and the voltage divider is fixed. The timing of the shutter release responds to the light incident on the photoconductor as reflected by the charge temporarily stored in the memory capacitor, and to the film speed rating and diaphragm opening by means of the correspondingly adjusted resistors and voltage dividers. The double-throw switch is mechanically coupled to the camera to switch the capacitor from the light measuring to the timing network immediately prior to the opening of the shutter.

The improved network is very reliable and accurate, and i. simple, versatile and highly adaptable.

The circuit for controlling the shutter closure initiating electromagnetic device is placed under control of memorized information of a memory capacitor and the operation changeover point voltage produced in response to such information input, so that the exposure time control operation may be performed in accordance with the photographing condition, and there is established an arrangement as follows: The charge on the memory capacitor is placed under control of a photoconductor placed in the path of the object light passing through the camera objective and sensing the object brightness; and RC timing circuit is arranged comprising a variable resistor to be adjusted according to photographing condition other than object brightness and a timing capacitor; the information charge upon the memory capacitor is discharged to the RC timing circuit in operative associated with shutter release initiating operation, the operation changeover or switching voltage is determined under control of a variable resistor to be adjusted in accordance with another photographing condition other than object brightness, the memorized information of the memory capacitor is placed under control of the photoconductor, the memorized information of the capacitor is placed under control of a variable resistor to be adjusted in geometric procession with common ratio 2 according to a still another photographing condition other than object brightness, so that the operation changeover point voltage is determined to be constant and exposure time control operation is accomplished in accordance with the information charge upon the memory capacitor under said two controls.

DESCRIPTION OF THE PREFERRED EMBODIMENTS

Figure 1:
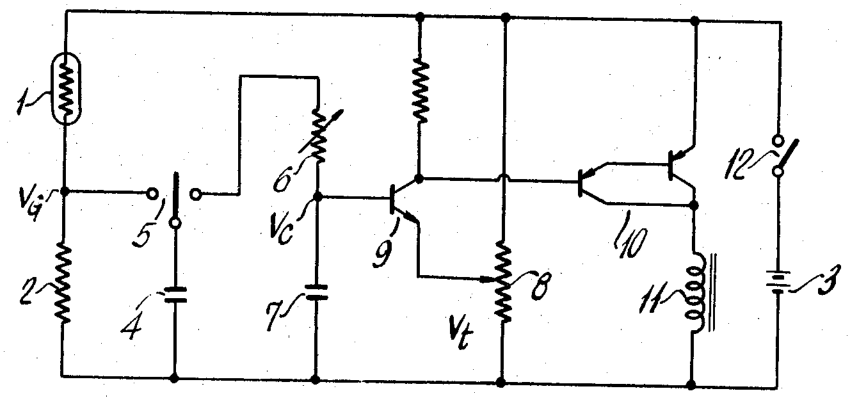
FIG. 1 is a circuit diagram of a preferred embodiment of the present invention.

Referring now to the drawing, and more particularly FIG. 1 thereof which illustrates a preferred embodiment of the present invention, the reference numeral 1 generally designates a photoconductor forming part of a through the lens light measuring system. The photoconductor 1 is so positioned in the camera as to be exposed to light traversing the camera objective and to be withdrawn or blocked from such light upon or shortly prior to the initiation of the shutter opening release operation. A voltage divider resistor 2 is connected in series with photoconductor 1 across a current source battery 3 through a switch 12, the battery 3 energizing the full network through switch 12. A memory capacitor 4 is connected in parallel with the voltage divider resistor 2 through one pole of a changeover double-throw switch 5 so as to be charged to the voltage $Vg$ appearing across the voltage divider resistor 2. The discharge memory capacitor 4, is effected by way of the other pole of the switch 5, through a timing circuit including in series connection, a variable resistor 6, which is adjusted in accordance with a photographing condition other than object brightness such as diaphragm value, and a timing capacitor 7. The resistance element of a potentiometer 8 is connected across battery 3 and is adjusted in accordance with still another photographing condition other than object brightness such as the sensitivity value of the used film. A switching transistor 9 is provided and across the base and the emitter thereof there are applied a signal voltage V$c$ from the terminals of the timing capacitor 7 and the divided voltage V$t$ derived from the aim of potentiometer 8. The collector output of the transistor 9 is applied to the control electrode of an amplifying transistor group 10 of high input impedance, thus establishing an operation control circuit of a shutter closure initiating electromagnetic device 11.

Figure 2:
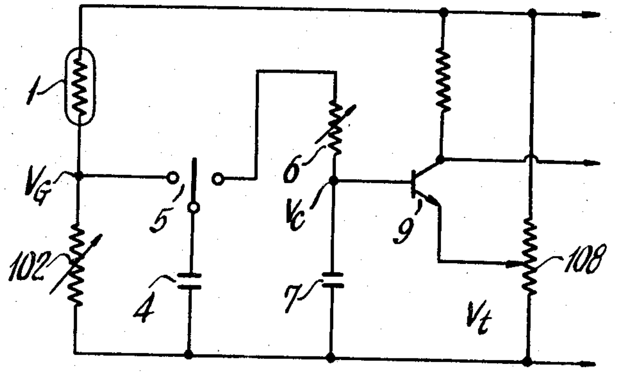
FIG. 2 is a circuit diagram of another embodiment thereof.

In FIG. 2 there is illustrated another embodiment of the present invention, in which circuit elements serving the same function as that of FIG. 1 are denoted by the same numerals. In this embodiment, instead of the fixed voltage divider resistor 2 of the first described embodiment there is employed a variable resistor 102 which is adjusted in accordance with a still another photographing condition other than object brightness such as the sensitivity value of the used film. Further, instead of the potentiometer 8 of the earlier embodiment there is employed a fixed tapped resistor 108. The value of this fixed resistor 108 determines a constant voltage V$t$ which acts as the operation changeover point or switching voltage of the switching transistor 9 of the operation control circuit. In all other respects the networks of the two embodiments are similar.

Figure 3:
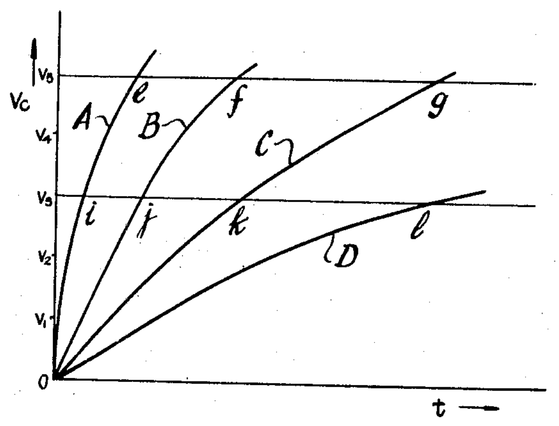
FIG. 3 is a graph illustrating the operating characteristics of the improved shutter control network.

FIG. 3 is a graph showing the characteristic curves of the fundamental circuit operation of the shutter according to the present invention. In this graph, the ordinate scale is plotted with the voltage V$c$ as the input signal voltage of the transistor 9 and the divided voltage V$t$ as the operation changeover point voltage thereof, and the abscissa scale indicates the time $t$. The characteristic curves A, B, C and D indicate the variation with time of the voltage V$c$ with respect to different object brightness and set diaphragm value conditions; while points $e, f, g, h$ and $i, j, k, l$ indicate the operation changeover points of the transistor 9 in response to the sensitivity value of the used film.

The operation of the improved shutter control networks described above is as follows:

Prior to shutter release initiation the switch 5 is in a position connecting the memory capacitor 4 in parallel with the voltage divider resistor 2 (the example of FIG. 1) or with the variable resistor 102 (the example of FIG. 2). When the current source switch 12 is closed under such condition, under the action of the variable resistor 6 and the potentiometer 8 (or the variable resistor 102) adjusted in accordance with corresponding photographing conditions other than object brightness, current starts to flow through the electromagnetic device 11 to prevent the shutter from being closed, and across the terminals of the memory capacitor 4 there is applied a voltage V$g$ determined by the resistance value of the photoconductor 1 produced in response to the brightness of the object light passing through the camera objective and the value of the voltage divider resistor 2 (or the variable resistor 102). In this manner the information is stored in the capacitor 4 as a charge thereon.

This memorizing operation is completed immediately after closure of the current source switch 12, and then the shutter release operation follows. In the first stage of the shutter release initiating operation the changeover switch 5 is so operated that the memory capacitor 4 is connected to the discharge circuit side. Then, the charge on the memory capacitor 4 is discharged through the variable resistor 6 and the timing capacitor 7.

Now referring to the transient phenomenon of this discharge circuit, since the current source of this discharge circuit is the charge on the memory capacitor 4, the relation between the voltage across the terminals thereof V$g$ and the voltage E of the battery 3 is as follows:

$$Vg=\frac{r}{R+r}E$$

where $R$ is the resistance value of the photoconductor 1 and $r$ is the resistance value of the voltage dividing resistor 2.

Now it is assumed that a voltage V$c$ is produced across the terminals of the timing capacitor 7 which is charged by the current $i$ of the discharge circuit. Between the Laplace transformation I(S) of the current $i$ indicated by the following relation:

$$I(S)\left(R+\frac{1}{SC}+\frac{1}{SC_1}\right)=\frac{r}{R+r}\cdot\frac{E}{S} \qquad \text{(I)}$$

(where $1/SC$ and $1/SC_1$ are the conversion impedances of the memory capacitor 4 and the timing capacitor 7, respectively) and the Laplace transformation $Vc(S)$ of the voltage V$c$, there is the following relation:

$$Vc(S)=I(S)\frac{1}{SC_1} \qquad \text{(II)}$$

From the above relations (I) and (II), the relation between the voltage V$c$ and the time $t$ is as follows:

$$Vc\fallingdotseq\frac{rE}{R+r}k(1-e-\frac{1}{R_1C_1k}t) \qquad \text{(III)}$$

where $R_1$ is the value of the variable resistor 6, $C_1$ is the capacitance of the timing capacitor 7, $k$ is a constant of a value indicated by a relation $k=c/C+C_1$, and $c$ is the capacitance of the memory capacitor 4.

Generally, in such arrangements no significant error is produced if, in the range of $t<<1$, the third term and further terms of the Taylor expansion of $e-1/R_1C_1k\ t$ of the relation (III) is omitted:

$$e-\frac{1}{R_1C_1k}t\doteqdot 1-\frac{t}{R_1C_1k},$$

applying this to the relation (III), we get $$Vc=\frac{rE}{R+r}\times\frac{t}{R_1C_1}$$

From the relation (IV), the time $t$ is:

$$t=Vc\frac{(R+r)R_1C_1}{rE} \qquad \text{(V)}$$

or $$t=\frac{VcR_1C_1}{E}\times\frac{R+r}{r}$$

when $r$, which is a voltage dividing resistor for obtaining information, becomes $r<<<R$, then $R+r/r>R/r$ and, from the relation (V), $$t=C_1/rE\times VcR_1\mathbf{b}\text{-}R \qquad \text{(VI)}$$

From the relation (VI), $C_1/rE$ of the example of FIG. 1 is of a constant value determined by the circuit design. The three factors for exposure time control are thus $C_1/rE$, the value $R$ of the photoconductor 1 and the value $R_1$ of the variable resistor 6. Since these factors act in the form of a numerical product, the factors can be caused to correspond to respective photographing conditions in a mutually independent manner, varying the factors in a certain manner, for example in geometric procession with common ratio 2. Thus, the variable resistor 6 may be adjusted in accordance with a photographing condition other than object brightness such as set diaphragm value so as to produce an input signal to the operation control circuit introducing such photographing condition.

The operation control circuit which has received such input signal performs the switching operations, as shown in FIG. 3, at the points $e, F, \ldots, 1$ of the characteristic curves A, B, C and D corresponding to respective conditions, with operation changeover point voltages $V_1, V_2, \ldots, V_5$ of the divided voltage V$t$ of the potentiometer 8 adjusted in accordance with a still another photographing condition other than object brightness such as the sensitivity of the used film. This operation controls the action of the electromagnetic device 11 through the transistor group 10 so as to initiate the shutter closure.

In the examples as shown in FIG. 2, with reference to the relation (VI) : $t=C_1/rE\times VcR_1R$, the value $r$ of the variable resistor 102 (corresponding to the voltage dividing resistor 2 of the example of FIG. 1) connected in series with the photoconductor 1 is set in accordance with the sensitivity or speed rating of the used film and this value acts as a factor in the exposure time control operation. On the other hand, under a constant operation changeover point voltage $Vt$ for the switching transistor 9 of the operation control circuit the switching operation is carried out and then shutter closure is initiated in the same manner as above mentioned.

In the example of the present invention as shown in FIG. 2, instead of varying the operation changeover point voltages $V_1$, $V_2$...., $V_5$ of the switching transistor 9 of the operation control circuit, a photographing condition other than object brightness is introduced as an input information to the timing capacitor 7, so that when variation of the operation changeover point voltages $V_1$, $V_2$, ...., $V_5$ are to be introduced the information signal must be within a row across the terminal voltage range of the timing capacitor 7 and when a shorter time $t$ is to be controlled, control must be made at the greater variation rate portion (in the vicinity of the point 0 of FIG. 3) of the charging characteristic of the timing capacitor 7. Under such condition the circuit is greatly influenced by ambient temperature, and particularly in a high-speed exposure time control an error is produced which is a source of trouble in practice. If the operation changeover point voltage is constant, then by introducing a relatively high value of this voltage (for example, the value $V_5$ of FIG. 3), control operation may be carried out at the small variation rate portion, in the vicinity of completion of charge, of the timing capacitor 7. Thus, according to the present invention, the set diaphragm value factor is readily introduced in exposure time control operation and influence upon the control action of the electron circuit elements is minimized, thus eliminating trouble in operation.

As explained above, in the shutter according to the present invention a memory capacitor is provided which memorizes a photographing condition due to object brightness, a variable resistor, which is adjusted in accordance with a photographing condition other than object brightness, is serially connected in the charging circuit of a timing capacitor which is charged by the memorized information charge on the memory capacitor, so that with the provision of a set diaphragm value as the photographing condition it is made possible to carry out a fully open diaphragm light measurement time control. Further, arrangement is so made that the memory capacitor is caused to memorize not only the object brightness condition but also another condition such as the sensitivity of the used film, diminishing the influence of ambient temperature upon electron circuit elements to such a degree as to maximize reliability and accuracy. The photographing conditions can be introduced in the time control operation in a mutually independent manner so that in introducing each photographing condition it is not necessary to consider other photographing conditions, and in practice the necessary arrangement for such introduction of a photographing condition can be selectively adopted.

While there have been described and illustrated preferred embodiments of the present invention, it is apparent that numerous alterations, omissions and additions may be made without departing from the spirit thereof. What is claimed is:

I claim:

1. A light controlled timing network comprising a memory capacitor (4), means including a photoconductor (1) and a voltage source (3) for charging said memory capacitor to a voltage which is a function of the light incident on said photoconductor, an adjustable timing network including a timing capacitor (7) and a variable resistor (6) connected in series, an electrically responsive shutter control device (11), a solid-state switch (9, 10) having a control input connected to said timing network and a controlled output connected to said shutter control device, and means including a first switch (5) for alternatively connecting said memory capacitor to said charging means or across said timing network wherein said memory capacitor discharges through said timing network to control said shutter control device.

2. The network of claim 1 wherein said charging means comprises a voltage divider including said photoconductor and a first resistor (2) connected in series, said memory capacitor being connected through said first switch between the junction of said photoconductor and said first resistor and a terminal of said voltage divider.

3. The network of claim 2 wherein said first resistor is variable.

4. The network of claim 1 comprising means including a second variable resistor (8) for varying the response voltage of said solid-state switch.

5. The network of claim 4 wherein said solid-state switch comprises an input transistor (9) including an emitter, and said second variable resistor comprises a potentiometer including a resistance element connected across said voltage source and a potentiometer arm connected to said emitter.

* * * * *